United States Patent [19]

Nishikawa et al.

[11] Patent Number: 4,876,910
[45] Date of Patent: Oct. 31, 1989

[54] TILTING STEERING APPARATUS

[75] Inventors: Masumi Nishikawa, Toyoake; Masanobu Ishikawa, Nagoya, both of Japan

[73] Assignee: Aisin Seiki Kabushiki Kaisha, Japan

[21] Appl. No.: 169,508

[22] Filed: Mar. 17, 1988

[30] Foreign Application Priority Data

Mar. 20, 1987 [JP] Japan .................................. 62-63975
Mar. 23, 1987 [JP] Japan .................................. 62-65583

[51] Int. Cl.⁴ ............................................... B62D 1/18
[52] U.S. Cl. .................................... 74/493; 74/540; 280/775
[58] Field of Search ................... 74/493, 540; 280/775

[56] References Cited

U.S. PATENT DOCUMENTS

| | | | |
|---|---|---|---|
| 4,463,626 | 8/1984 | Kazaoka et al. | 74/493 |
| 4,538,477 | 9/1985 | Kurusu et al. | 74/493 |
| 4,538,478 | 9/1985 | Sato et al. | 74/493 |
| 4,722,241 | 2/1988 | Yoshida et al. | 74/493 |
| 4,723,461 | 2/1988 | Yoshida et al. | 74/493 |
| 4,750,379 | 6/1988 | Nishikawa et al. | 74/493 |
| 4,819,498 | 4/1989 | Nishikawa | 74/493 |

FOREIGN PATENT DOCUMENTS 57-155156 7/1982 Japan .

Primary Examiner—Allan D. Herrmann
Attorney, Agent, or Firm—Finnegan, Henderson, Farabow, Garrett & Dunner

[57] ABSTRACT

A tilting steering apparatus for a vehicle includes a fixed bracket secured to the vehicle chassis, a movable bracket pivotally supported on the fixed bracket, a ratchet provided on the movable bracket and having ratchet teeth, a pawl having pawl teeth meshing with the ratchet teeth and constraining the ratchet position, a tilt operating lever causing the pawl teeth and ratchet teeth to mesh and unmesh, means for biasing the movable bracket to a lifted position with respect to the fixed bracket, a main lever pivotally supporting the pawl and rotatably supported by a first pin about which the movable bracket is turned, a second pin secured to the fixed bracket so as to abut against the other end of the main lever to inhibit turning of the main lever in one direction, a hook lever supported by the fixed bracket so as to clamp the main lever in the inhibit position in cooperation with the second pin, a lifted-position lock member provided on the fixed bracket so as to engage at a lifted position a projection on the ratchet, a lifting lever pivotally mounted on the fixed bracket and adapted to unclamp the main lever by the turning of the hook lever, and a return lever pivotally supported on the fixed bracket for disengaging the lifted position lock member and the ratchet member from each other.

6 Claims, 7 Drawing Sheets

TILTING STEERING APPARATUS

BACKGROUND OF THE INVENTION

1. Field of the Invention:

This invention relates to a tilting steering apparatus having a memory mechanism for tilting the steering wheel of a motorized vehicle.

2. Description of the Prior Art:

A tilting steering apparatus having a memory mechanism is disclosed in the specification of Japanese Patent application Laid-Open (KOKAI), No. 57-155156. This prior-art apparatus is basically designated so that a movable bracket is rotatably supported on a fixed bracket by a pin carrying a pawl and a memory lever each having teeth, with a latch being provided on the fixed bracket. When the steering wheel is lifted or tilted away from the driver, the teeth of the pawl are disengaged from the latch teeth at the same time that the memory lever is engaged with the latch. Thus, during normal operation, the steering wheel position is controlled by the engagement between the pawl and the latch. When the steering wheel is lifted, the pawl and the latch are unmeshed, while the movable bracket rotatably retaining the steering wheel and the shaft is turned about the pin to its lifted position. To return the movable bracket from the lifted position to the original position, the memory lever and the latch are disengaged at the same time that the pawl is meshed in situ with the latch.

In the above-described prior art tilting steering apparatus, the pawl and the latch are not meshing in the lifted position and the steering wheel is held in position only under the biasing force of a spring the ends of which are connected to the movable bracket and fixed bracket. Therefore, when the driver rests his hand on the steering wheel when climbing into or alighting from the vehicle, the steering wheel moves downwards, throwing the driver off balance, or the steering wheel returns to the memorized position. This is a first problem of the prior art.

Further, in the prior art tilting steering apparatus, shifting the steering wheel to its lifted position and then back to the driving position is performed by operating a lever. Therefore, if the lever is inadvertently shifted during driving or parking, the steering wheel may suddenly shift to its lifted position. This is a second problem encountered in the prior art.

SUMMARY OF THE INVENTION

An object of the present invention is to provide a tilting steering apparatus which solves the aforementioned problems encountered in the prior art.

In accordance with the present invention, the aforementioned first problem is solved by providing a tilting steering apparatus for a vehicle, which comprises: a fixed bracket secured to a chassis of the vehicle; a movable bracket pivotally supported on the fixed bracket; a ratchet provided on the movable bracket and having terminal ratchet teeth; a pawl having pawl teeth meshing with the terminal ratchet teeth and constraining the ratchet position; a tilt operating lever causing the pawl teeth and the terminal ratchet teeth to be meshed and unmeshed with each other; means for biasing the movable bracket to a lifted position with respect to the fixed bracket; a main lever rotatably supported by a first pin about which the movable bracket is turned, the main lever pivotally supporting the pawl; a second pin secured to the fixed bracket so as to abut against the other end of the main lever to inhibit turning of the main lever in one direction; a hook lever supported by the fixed bracket so as to clamp the main lever in the inhibit position in cooperation with the second pin; a lifted position lock member provided on the fixed bracket so as to engage at a lifted position a projection provided on the ratchet; a lifting lever pivotally mounted on the fixed bracket and adapted to unclamp the main lever by the turning of the hook lever; and a return lever pivotally supported on the fixed bracket for disengaging the lifted position lock member and the ratchet member from each other.

In the tilting steering apparatus of the present invention, the ratchet and the pawl are unmeshed at tilt adjustment of the steering wheel. When the steering wheel is shifted to its lifted position, however, the restraint placed on the main lever by the second pin and the hook lever is released, with the pawl and the ratchet being kept in the meshed state. The locking mechanism operates when the steering wheel attains the lifted position. The locking mechanism is capable of being released on actuation of the return lever.

In accordance with the present invention, the aforementioned second problem is solved by providing a tilting steering apparatus for a vehicle, which comprises: a movable bracket rotatably supported on a first pin provided on a fixed bracket; a ratchet provided on the movable bracket and having ratchet teeth; a tilt operating lever and a main lever rotatably supported on the first pin and pivotally mounting a pawl, the pawl having pawl teeth meshed and unmeshed with the ratchet teeth by the operation of the tilt operating lever; a second pin contactable with the end portion of the main lever and provided on the fixed bracket; a hook lever rotatably supported on the fixed bracket; a lift operating lever having teeth and normally kept in a neutral position, the hook lever being capable of clamping and locking the end portion of the main lever in cooperation with the second pin, the hook lever including a portion causing the hook lever to be turned so as to release the main lever when the lift operating lever is turned in one direction; locking means provided on the fixed bracket and adapted to lock the ratchet to the fixed bracket when the lifted state prevails, and unlock the ratchet when the lift operating lever is turned in the other direction; an electric motor having teeth meshing with the teeth of the lift operating lever; a first switch for sensing the neutral position of the lift operating lever; a second switch for sensing that the movable bracket has shifted to its lifted position; a third switch for sensing the locked state of the main lever; and a spring having ends retained by the fixed bracket and the movable bracket.

Thus, the lift operating lever is provided with teeth engaged with the electric motor, so that the lever can be actuated depending upon whether a key is inserted into or withdrawn from the electric motor. Thus, the steering wheel may be automatically moved or returned to the lifted position by withdrawing the key or to the operating position by inserting the key.

In accordance with the present invention, the steering wheel is moved to its lifted position while the pawl is kept meshed with the ratchet. Therefore, teeth are not skipped even when the steering wheel is depressed strongly from the lifted position to the previous position. In addition, since only the main lever and hook lever are added, the number of component parts is relatively small and the manufacturing cost is low.

In accordance with the present invention, since only the teeth of the lift operating lever, the limit switches and the electric motor are added to the basic structure of FIG. 1, the overall structure is simple. Operability is also improved since the lifting and return operations are performed merely by inserting and withdrawing the key. The pawl is pivotally mounted on the main lever and the lifting operation is performed with the main lever in the movable state. In this manner, the steering wheel is returned to the original position reliably without the pawl and the ratchet being meshed improperly, as occurs in the prior art.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
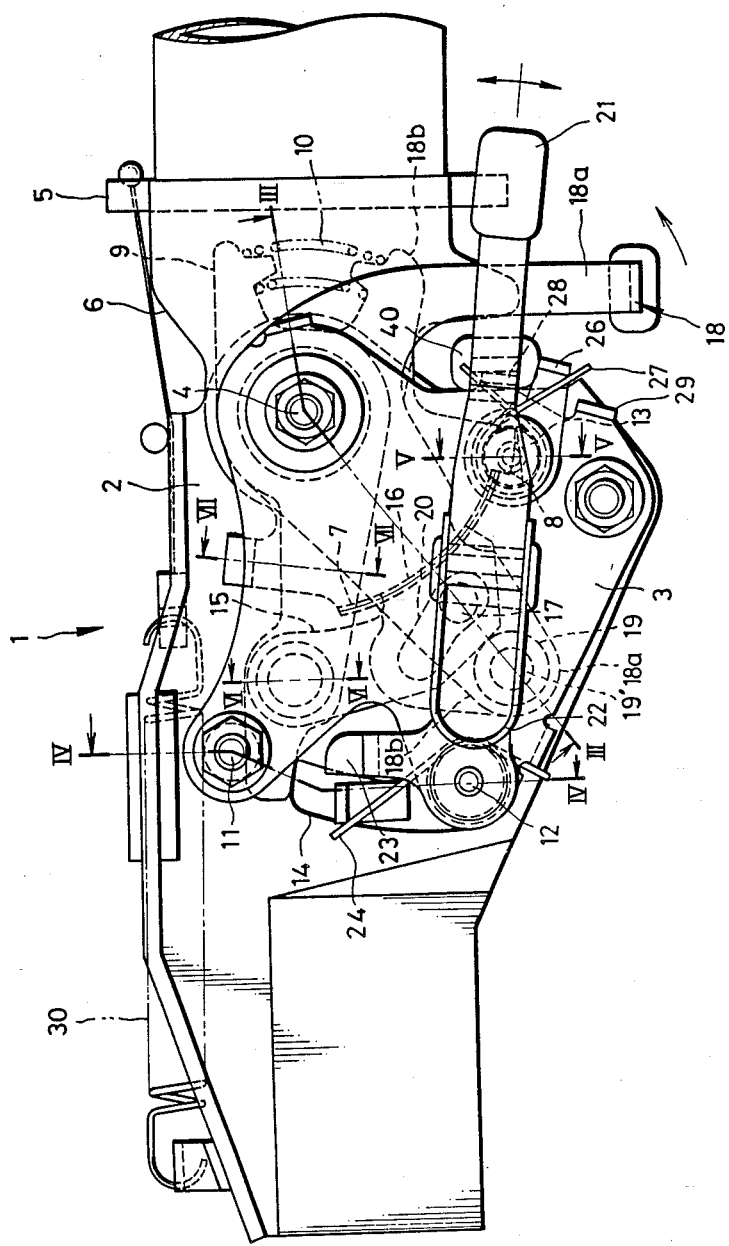
FIG. 1 is a front view showing an embodiment of a tilting steering apparatus according to the present invention.

A first embodiment of a tilting steering apparatus in accordance with the present invention will now be described with reference to FIGS. 1 through 7. A cover is provided facing and spaced apart from a fixed bracket 2 secured to the chassis of a vehicle and a first pin 4 is implanted between the bracket 2 and the cover 3. A ratchet 6 secured to a movable bracket 5 adapted to rotatably hold a steering wheel and shaft is supported by the pin 4 through bearing means, not shown. The ratchet 6 has teeth 7 on one side thereof and a projection 8 at the end of the teeth 7. A main lever 9 is also supported by the pin 4. The main lever 9 is elongated and biased at one end thereof by a spring 10 so as to be turned counter-clockwise in FIG. 1. In addition to the first pin 4, second, third and fourth pins 11, 12, 13 are passed through the fixed bracket 2 and the cover 3. A hook lever 14 supported by the second pin 12 is engaged with one end of the main lever 9 to normally prevent the main lever 9 from being turned counter-clockwise under the force of the spring 10. The engaging end of the hook lever 14 is engaged at a tapered portion thereof with a mating engaging portion of the main lever 9 to prevent the hook lever 14 from being turned clockwise. The main lever 9 is inhibited from being turned clockwise by a second pin 11. A pawl 15 is pivotally mounted on the main lever 9. The pawl 15 is provided with teeth 16 engaging with the teeth 7 of the ratchet 6, and an implanted pin 17.

A tilt operating lever 18 is formed by a pair of plates 18a, 18b, both of which are rotatably supported by bearings, not shown. The plates 18a, 18b are spaced apart from each other by a pin 19'. The one plate 18a has a cam slot 20 in which the pin 17 implanted in the pawl 15 is received, while the other plate 18b retains the other end of the spring 10. A collar 19 supported on the pin 19' is urged against the back surface of the pawl 15 by the biasing force of the spring 10.

An elongated, generally L-shaped lift operating lever 21 is rotatably supported on the third pin 12 and is normally at a rest position, which is the position shown, under the biasing force of a torsion spring 22. The other end of the operating lever is abuttable against the hook lever 14 to inhibit rotation of the hook lever 14 which, under the biasing force of a spring 24, attempts to turn clockwise about the third pin 12.

Figure 5:
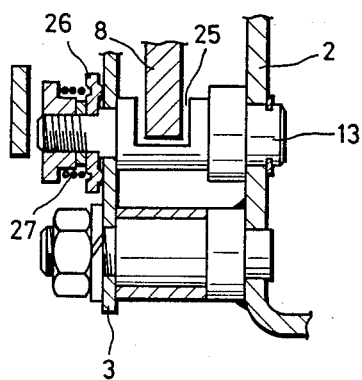
FIG. 5 is a fragmentary sectional view taken along line V—V of FIG. 1.
Figure 6:
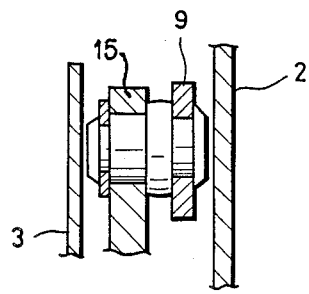
FIG. 6 is a fragmentary sectional view taken along line VI—VI of FIG. 1.
Figure 7:
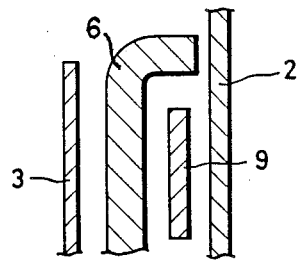
FIG. 7 is a fragmentary sectional view taken along line VII—VII of FIG. 1.
Figure 9:
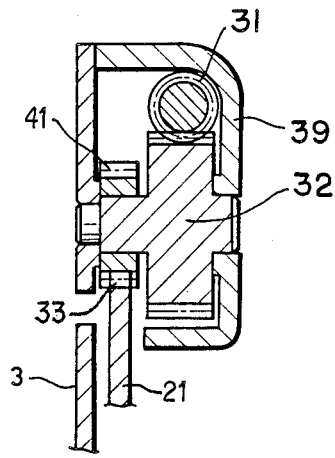
FIG. 9 is a fragmentary sectional view taken along line IX—IX of FIG. 8.

The fourth pin 13 has a substantially arcuate recess 25, as shown in FIGS. 1 and 5, with the projection, 8 of the ratchet 6 normally being loosely inserted in the recess 25. Arranged on the fourth pin 13 is a stopper plate 26 fixed in the rotational direction and acted upon by one end of a torsion spring 27 to normally abut against a stopper 28. The stopper plate 26 can be turned by the lever 21 against the biasing force of the spring 27 to the position of another stopper 29.

A spring 30 having both ends thereof secured to the brackets 2 and 5 attempts to turn the movable bracket 5 counter-clockwise about the pin 4. However, the teeth 7 of the ratchet 6 secured to the movable bracket 5 mesh with the teeth 16 of the pawl 15 positioned between the collar 19 and the ratchet 6, while the end of the main lever 9 pivotally supporting the pawl 15 is clamped by the hook lever 14 and the second pin 11 to completely inhibit movement of the main lever 9. Therefore, the movement of the movable bracket 5 with respect to the fixed bracket 2 is not as shown in FIG. 1.

Steering Wheel Tilting Adjustment

When adjusting the tilt of the steering wheel, one end of the operating lever 18 is moved in the direction of the arrow to turn the lever 18 counter-clockwise about the pin 4. Such movement results in a modified relative position between the pin 17 and the cam slot 20 and in a modified contact position between the collar 19 and the pawl 15, with the teeth 16 of the pawl 15 being disengaged from the teeth of the ratchet 6. The result is that the ratchet 6 and the movable bracket 5 are freed from the remaining components of the apparatus so as to be adjustable to any desired position. After the steering wheel is moved to the desired position, the tilt operating lever 18 is returned and the pin 17 is moved by the cam slot 20 towards the ratchet 6 to cause the teeth 7, 16 of the ratchet 6 and pawl 15, respectively, to mesh with each other. The meshing position represents the newly memorized position, which is positively maintained by the collar 19 thrusting the pawl 15 against the ratchet 6.

Lifting Operation

The lift operating lever 21 is turned upwards as shown by the arrow in FIG. 1. With the lever thus being turned counter-clockwise about the third pin 12, the hook lever 14 is urged leftwards by the other end 23 of the operating lever 21 to disengage the hook lever 14 from the end of the main lever 9. Thus the ratchet 6, tilt operating lever 18, pawl 15 and main lever 9 are rendered rotatable as one about the first pin 4 by the spring 30, so that the steering wheel may be shifted, to the lifted or tilted-away position.

Locking means are provided for locking the ratchet 6 in the lifted position of the steering wheel. The following describes this lifted position locking action.

Figure 2:
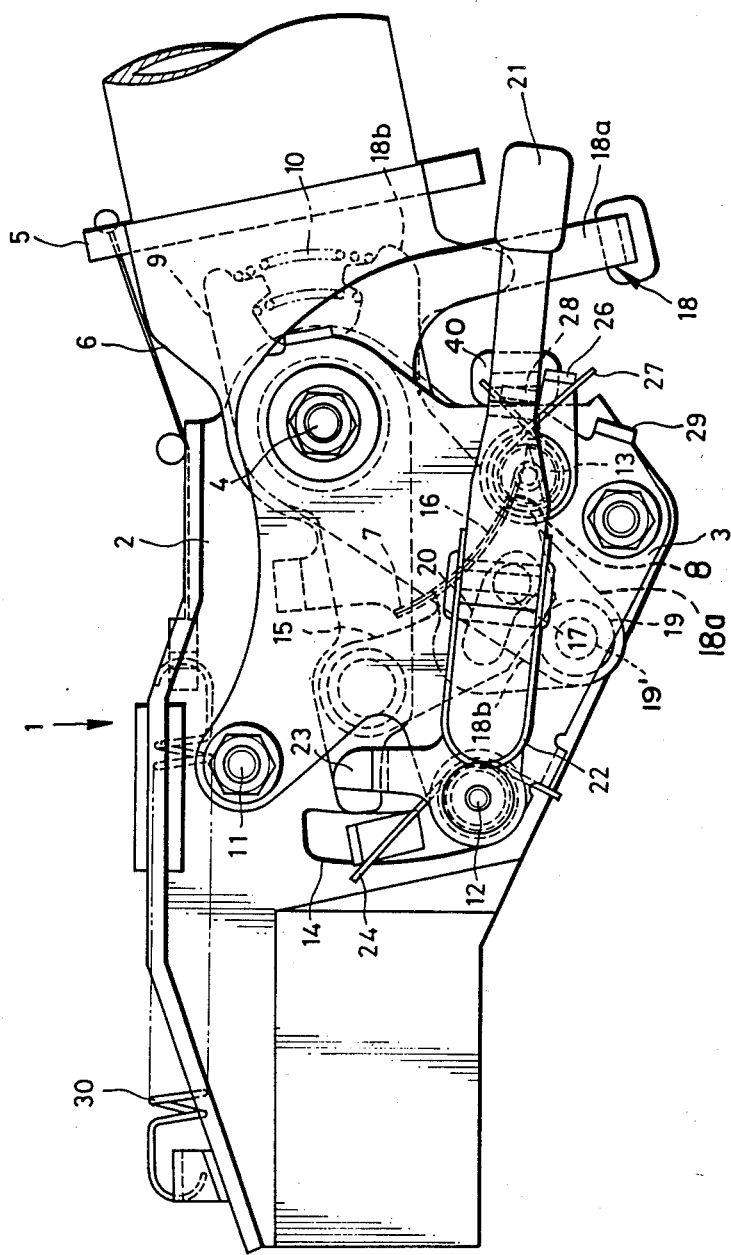
FIG. 2 is a front view showing the lifted state the apparatus shown in FIG. 1.
Figure 3:
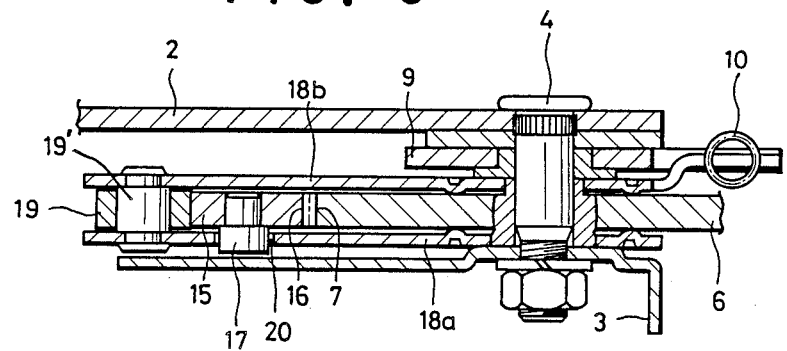
FIG. 3 is a fragmentary sectional view taken along line III—III of FIG. 1.
Figure 4:
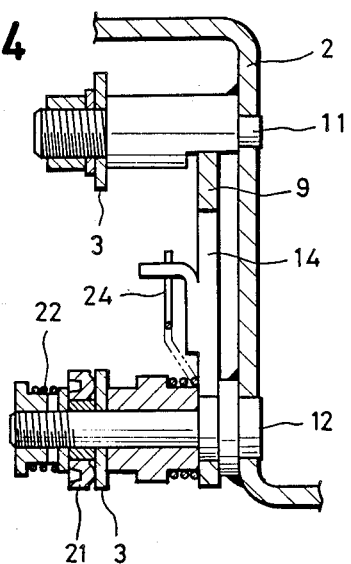
FIG. 4 is a fragmentary sectional view taken along line IV—IV of FIG. 1.

The rotation of the ratchet 6 about the pin 4 results in disengaging the projection 8 from the recess 25 of the fourth pin 13 and in the spring 27 and stopper plate 26 slightly turning the fourth pin 13 to cause the side edge of the projection 8 to be retained by the edge of the recess 25. The result is that the turning of the ratchet 6 clockwise about the first pin 4 is inhibited by the projection 8 being retained by the recess 25, while counter-clockwise turning thereof is inhibited by the ratchet 6 abutting against a rubber stopper 40 secured to the fixed bracket 2, so that the steering wheel is locked in its lifted position. This state is shown in FIG. 2.

Unlocking

The lift operating lever 21 is urged downwardly, as shown by the arrow in FIG. 1. Such turning of the lever 21 clockwise about the third pin 12 results in the lever 21 abutting against the stopper plate 26 to cause the stopper plate 26 and <the, fourth pin 13 to be turned clockwise in FIG. 1. By turning the fourth pin 13, the stopper plate 26 acts as a return lever, causing the projection 8 to be released and disengaged from the recess 25 to accommodate the projection 8 in the recess 25, as shown in FIG. 5, thereby effecting unlocking. On depression of the steering wheel, the ratchet 6 and the main lever 9 are turned clockwise about the first pin. When the main lever 9 is returned to the position shown in FIG. 1, the hook lever 14 is returned by the spring 24 to the position shown in FIG. 1, the end of the main lever 9 being sandwiched between the second pin 11 and the hook lever 14, with the main lever 9, pawl 15, tilt operating lever 18, ratchet 6 and movable bracket 5 all assuming a state secured with respect to the fixed bracket 2. It should be noted that a return lever, not shown, may be provided for disengaging the projection 8 from the recess to effect unlocking in addition to the lift operating lever 21.

Figure 8:
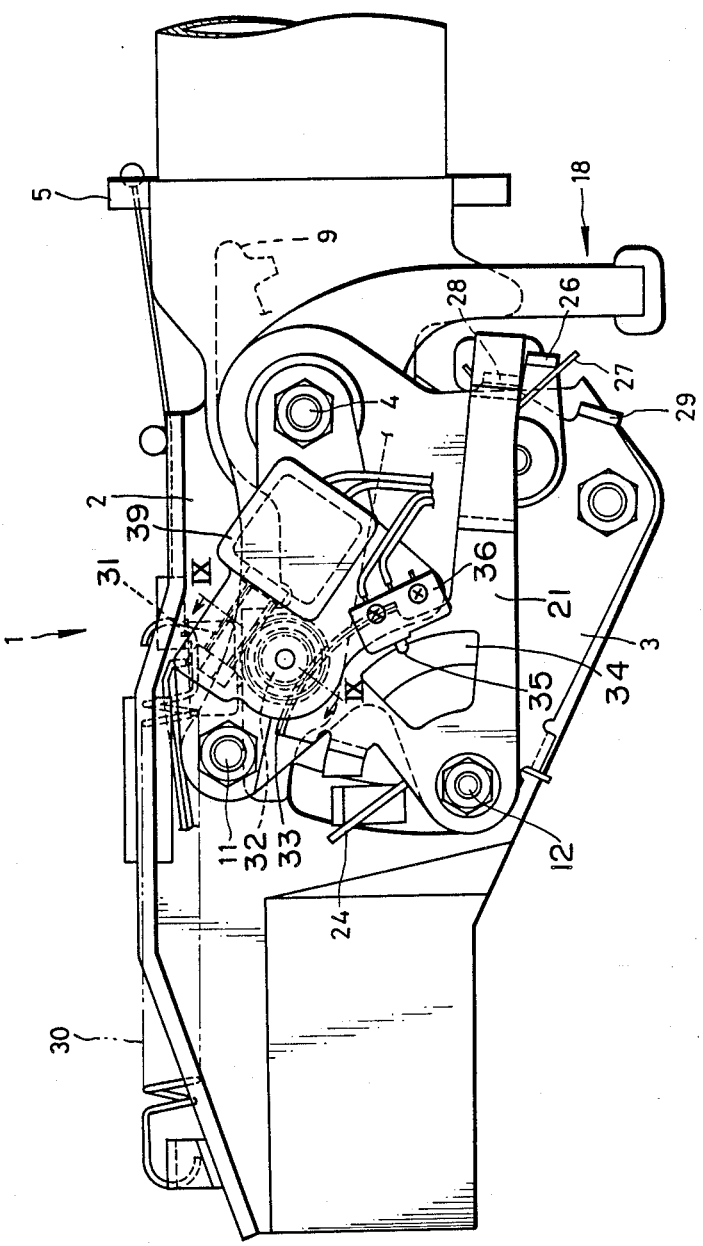
FIG. 8 is a front view showing another embodiment of a tilting steering apparatus according to the present invention.

In an embodiment shown in FIG. 8, the lift operating lever 21 is driven by an electric motor 39 acting as a power source. The electric motor 39 and a worm gear 31 are supported on the cover 3 and a worm wheel 32 is engaged with the worm gear 31. The worm wheel 32 is mounted coaxially with a gear 41 which meshes with teeth 33 formed in the lift operating lever 21. A notch 35 is formed in the side edge of a plate 34 secured to the lever 21. A sensor 36 for sensing the neutral position of the lift lever is provided on the side of the cover 3 and in facing relation to the side edge of the plate 34. In this embodiment, when the motor 39 is rotated in one direction, the lift operating lever 21 is turned e.g. counter-clockwise, with the steering wheel being moved to the tilted-away position under the biasing force of the balancing spring 30 to effect locking. When the motor 39 is then rotated in the reverse direction and halted as the notch 35 is sensed by the sensor 34, the lift operating lever 21 is brought to its neutral position.

By such reverse rotation, the lift operating lever 21 is turned clockwise to effect unlocking. Thus, on depression of the steering lever, the main lever is secured by the pin and the hook lever and is returned to the position which prevailed before the lift operation. Then, when the motor is driven in the reverse direction until the notch 35 is sensed by the sensor 34, the lift operating lever 31 is returned to its neutral position.

In the embodiment shown in FIG. 8, the lift operating lever 21 is driven by the electric motor 39 acting as a power source. The operating lever 21 is provided with an arcuate portion having teeth 33 engaging with a gear formed on the worm wheel 32, which is connected to the electric motor 39 via the worm gear 31. If necessary, the rpm of the motor 39 may be lowered by using a speed reducer. The electric motor 39, worm gear 31 and worm wheel 32 are retained by the cover 3.

Figure 10:
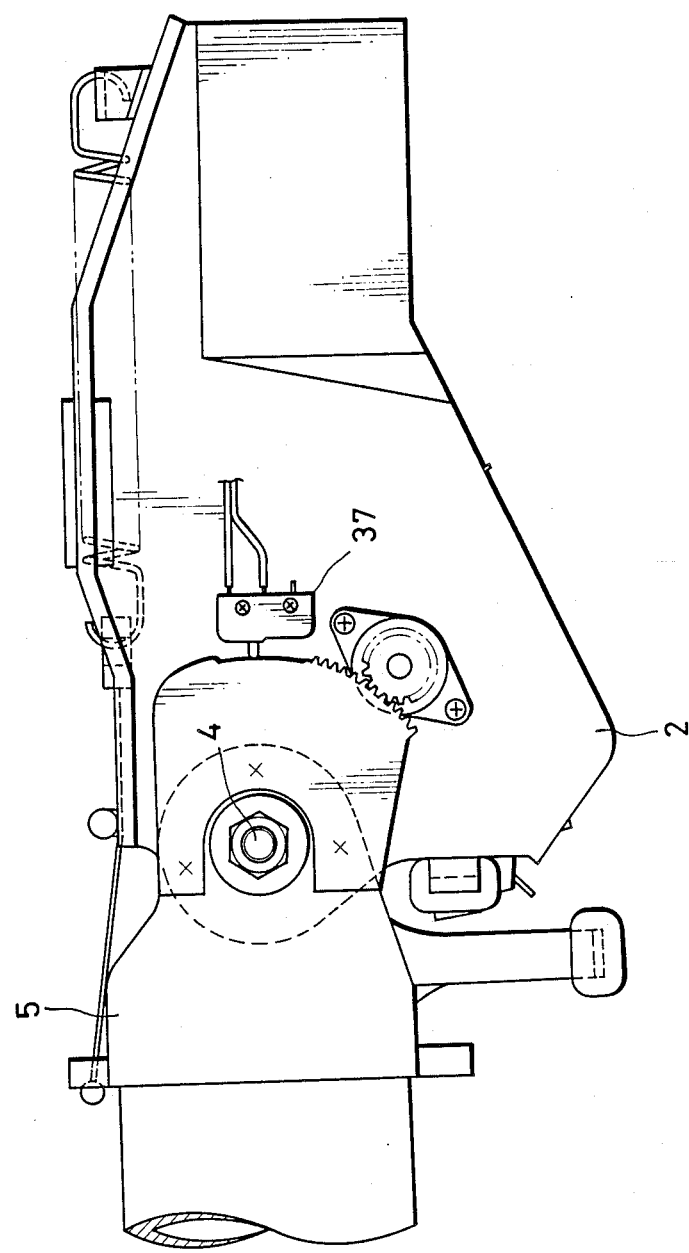
FIG. 10 is a rear view of FIG. 8.

The notch 35 is formed in the side edge of the plate 34 secured to the lift operating lever 21 and a first limit switch 36 for sensing the neutral position of the lift operating lever 21 is provided on the cover 3 and in opposition to the side edge of the plate 34. Also, as shown in FIG. 10, a second limit switch 37 for sensing that the movable bracket 5 has been brought to the lifted position is provided on the fixed bracket 2. In addition, a third limit switch 38 for sensing that the main lever 9 is in the locked state shown in FIG. 1 is provided on the fixed bracket 38.

Figure 11:
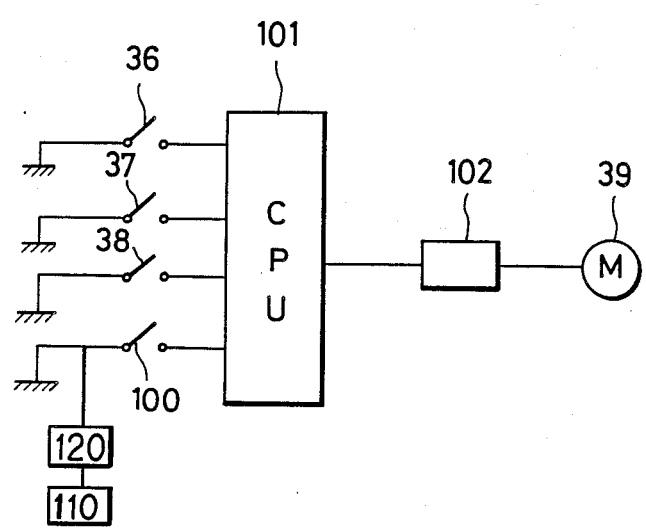
FIG. 11 is a circuit diagram showing a control circuit employed in the apparatus of the present invention.

As shown in FIG. 11, the electric motor 39 is controlled by a control circuit 101 having a microcomputer. Connected to the control circuit 101 is an unlock warning switch 100 arranged among the first to third limit switches 36 to 38 and an ignition switch, not shown and adapted to be opened and closed depending upon whether a key is or is not inserted into the ignition switch. A driver 102 is also connected to the control circuit 101 to drive the electric motor 39 in the normal or reverse direction depending upon whether the respective switch is opened or closed.

The operation of the apparatus will now be described. When the driver removes the key 110 from the ignition switch 120, the unlock warning switch 100 arranged in the ignition switch is opened or closed. The electric motor 39 is driven in one direction to cause rotation of the worm gear 31 and the worm wheel 32, whereby the lift operating lever 21 is turned counter-clockwise about the third pin 12 to shift the steering wheel to the lifted position. When the second limit switch 37 senses the lifted position of the steering wheel, the motor 39 is reversed in operation and, when the first limit switch 36 senses the neutral position of the lift operating lever 21, the motor 39 is halted. The operation or movement of the components during this operation is the same as that already described in connection with the lift operation.

Upon insertion of the key, the electric motor 39 is rotated in the direction opposite that described hereinabove so that the lift operating lever 21 is turned counter-clockwise about the third pin 12 to actuate the stopper lever 26, thereby disengaging the projection 8 from the recess 25. This enables the movable bracket 5 to be returned. Thus, on depression, the main lever 9 and the hook lever 14 are engaged with each other in the original position. When the third limit switch 38 senses that the main lever 9 and the hook lever 14 have been returned to the starting position shown in FIG. 1, the operation of the electric motor 39 is reversed. When the first limit switch 36 senses that the lift operating lever 21 has also returned to its starting position, the operation of the motor 39 is halted to assure the operating position of the steering wheel.

As many apparently widely different embodiments of the present invention can be made without departing from the spirit and scope thereof, it is to be understood that the invention is not limited to the specific embodiments thereof except as defined in the appended claims.

What is claimed is:

1. A tilting steering apparatus for a vehicle, which comprises:
   a fixed bracket secured to a chassis of the vehicle;
   a movable bracket pivotally supported on said fixed bracket;
   a ratchet provided on said movable bracket and having terminal ratchet teeth;
   a pawl having pawl teeth meshing with the terminal ratchet teeth and constraining the ratchet position;
   a tilt operation lever causing the pawl teeth and the terminal ratchet teeth to be meshed and unmeshed with each other;
   means for biasing said movable bracket to a lifted position with respect to said fixed bracket;
   a main lever rotatably supported by a first pin about which said movable bracket is turned, said main lever pivotally supporting the pawl;
   a second pin secured to said fixed bracket so as to abut against the other end of said main lever to inhibit turning of said main lever in one direction;
   a hook lever supported by said fixed bracket so as to clamp said main lever in the inhibit position in cooperation with said second pin;
   a lifted position locking means provided on said fixed bracket for engaging and locking at a lifted position a projection provided on said ratchet;
   a lift operating lever pivotally mounted on said fixed bracket and adapted to unclamp said main lever by the turning of said hook lever; and
   a return lever pivotally supported on said fixed bracket for disengaging the lifted position lock means and said projection of said ratchet member from each other.

2. The apparatus according to claim 1, wherein said lift operating lever is provided with an engaging portion for releasing said lifted position lock member, said lift operating lever being engaged with said hook lever when turned in one direction and being engageable with said lifted position lock member then turned in the other direction, spring means being provided for maintaining said lever in a neutral position.

3. The apparatus according to claim 1, wherein said tilt operating lever comprises a pair of plates, one of said plates including a cam slot and the other of said plates being adapted to seat a spring at one end thereof, said spring being fastened to said main lever at the other end thereof.

4. The apparatus according to claim 1, wherein said lifted position locking means includes a fourth pin having a recess formed therein, said projection provided on said ratchet for being received in said recess, a stopper plate fixed relative to said fourth pin in the rotational direction, and a spring for biasing said stopper plate in one direction, said ratchet being locked to said fixed bracket when an edge of said recess engages an edge of said projection.

5. A tilting steering apparatus for a vehicle, which comprises:
   a movable bracket rotatably supported on a first pin provided on a fixed bracket;
   a ratchet provided on said movable bracket and having ratchet teeth;
   a tilt operating lever and a main lever rotatably supported on the first pin and pivotally mounting a pawl, said pawl having pawl teeth meshed and unmeshed with the ratchet teeth by the operation of said tilt operating lever;
   a second pin contactable with an end portion of said main lever and provided on said fixed bracket;
   a hook lever rotatably supported on said fixed bracket;
   a lift operating lever having teeth and normally kept in a neutral position, said hook lever being capable of clamping and locking the end portion of said main lever in cooperation with said second pin, said hook lever including a portion causing said hook lever to be turned so as to release said main lever when said lift operating lever is turned in one direction;
   locking means provided on said fixed bracket and adapted to lock said ratchet to said fixed bracket when the lifted state prevails, and unlock said ratchet when said lift operating lever is turned in the other direction;
   an electric motor having teeth meshing with the teeth of said lift operating lever;
   a first switch for sensing said neutral position of said lift operating lever;
   a second switch for sensing that said movable bracket has shifted to its lifted position;
   a third switch for sensing the locked state of said main lever;
   and a spring having ends retained by said fixed bracket and said movable bracket.

6. The apparatus according to claim 5, wherein said electric motor causes said lift operating lever to be turned in said one direction when a key is withdrawn and in said other other direction when the key is inserted.

* * * * *

UNITED STATES PATENT AND TRADEMARK OFFICE
CERTIFICATE OF CORRECTION

PATENT NO. : 4,876,910

DATED : October 31, 1989

INVENTOR(S) : Nishikawa et al.

It is certified that error appears in the above-identified patent and that said Letters Patent is hereby corrected as shown below:

Claim 2, column 7, line 49, change "then" to --when--.

Signed and Sealed this

Twenty-seventh Day of August, 1991

*Attest:*

HARRY F. MANBECK, JR.

*Attesting Officer*     *Commissioner of Patents and Trademarks*